No. 653,809. Patented July 17, 1900.
N. JACOBSOHN.
FILTERING MATERIAL.
(Application filed Feb. 28, 1899.)

(No Model.) 2 Sheets—Sheet 1.

Witnesses:
E. Holloway
W. C. Pinckney

Nicholas Jacobsohn, Inventor
by J S U Bowen, Att'y.

THE NORRIS PETERS CO., PHOTO-LITHO., WASHINGTON, D. C.

No. 653,809. Patented July 17, 1900.
N. JACOBSOHN.
FILTERING MATERIAL.
(Application filed Feb. 28, 1899.)

(No Model.) 2 Sheets—Sheet 2.

Witnesses:
C. Holloway
H. C. Pinckney

Nicholas Jacobsohn, Inventor
by J. C. M. Bowen, Atty.

UNITED STATES PATENT OFFICE.

NICHOLAS JACOBSOHN, OF ST. PETERSBURG, RUSSIA.

FILTERING MATERIAL.

SPECIFICATION forming part of Letters Patent No. 653,809, dated July 17, 1900.

Application filed February 28, 1899. Serial No. 707,163. (No specimens.)

*To all whom it may concern:*

Be it known that I, NICHOLAS JACOBSOHN, a subject of the Emperor of Russia, and a resident of St. Petersburg, Russia, have invented certain new and useful Improvements in Filtering Material, of which the following is a specification.

Figure 1:
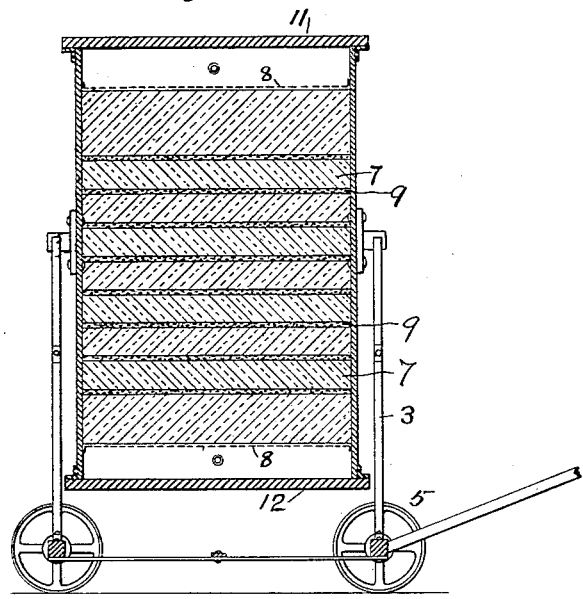
Figure 2:
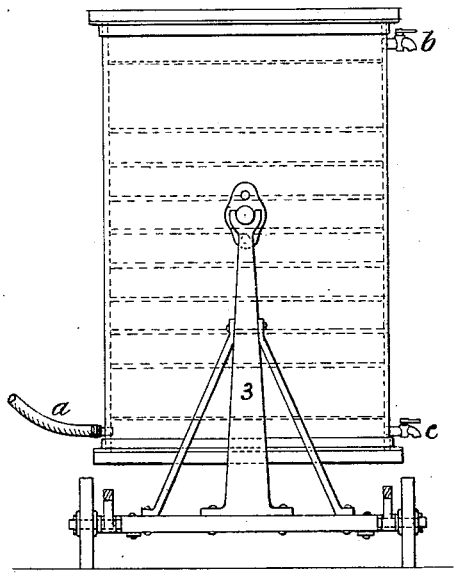
Figure 3:
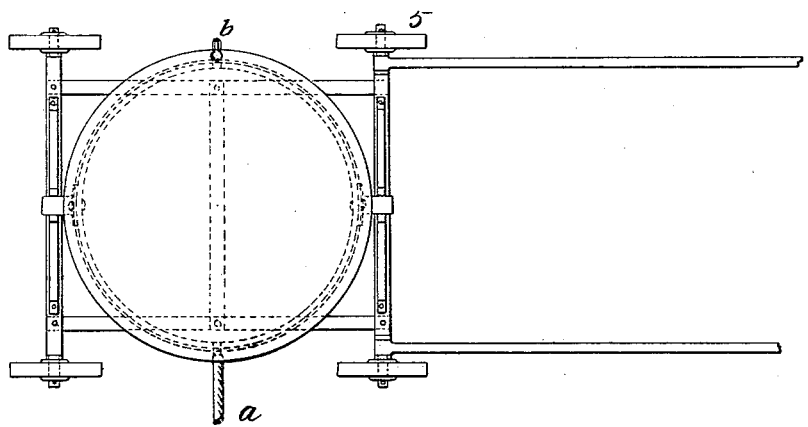
Figure 4:
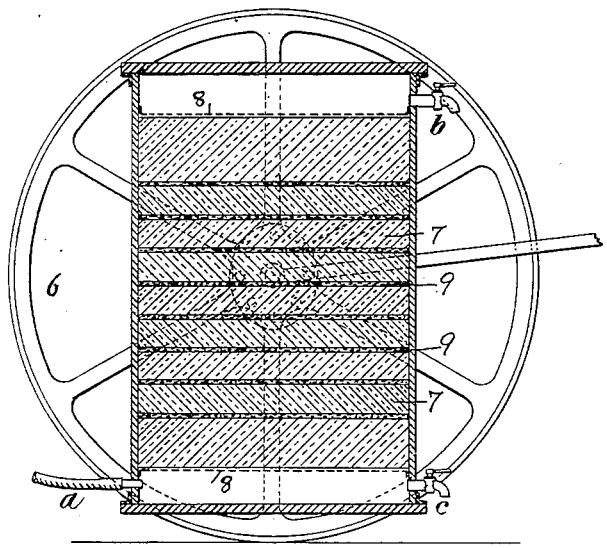
Figure 5:
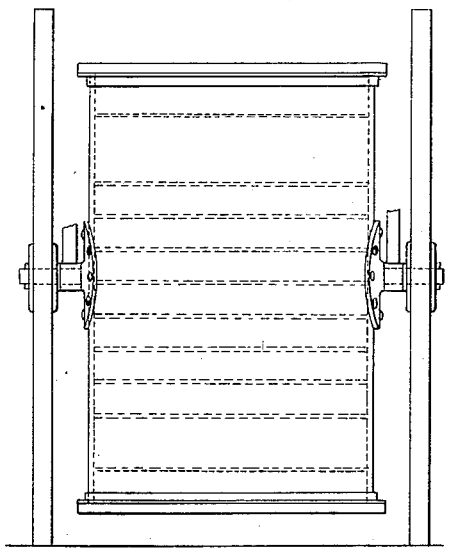
Figure 6:
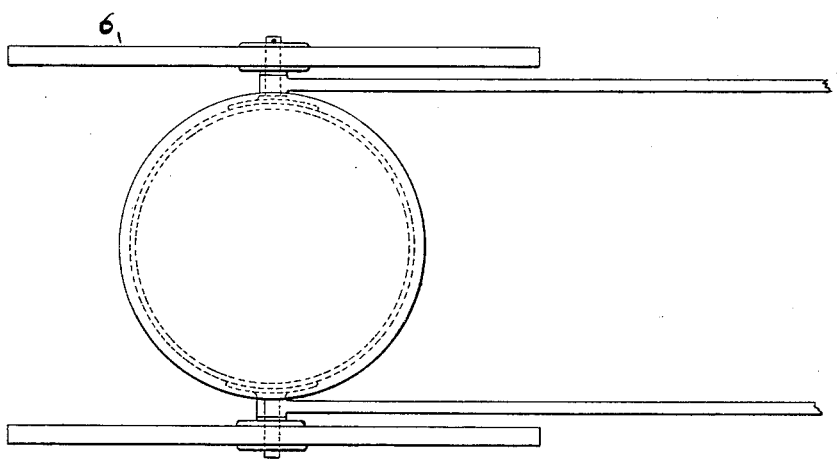

In the drawings, Figure 1 is a central vertical longitudinal section of filter and its support. Fig. 2 is a side view thereof from the right. Fig. 3 is a plan view. Figs. 4, 5, and 6 are like views showing a different form of support.

In the drawings is shown a rotative filter (which is preferably used for my filtering material) comprising a cylindrical vessel of sheet metal closed at both ends by covers 11 12, both of which are preferably removable and provided with a feeding-tube $a$, with a delivery-cock $b$, and with a purging-cock $c$. The cylinder of the filter rotates on two trunnions supported by two standards 3, Fig. 7, fixed to the floor or on a frame mounted on rollers 5, Figs. 1 to 3, or on wheels 6, Figs. 4 to 6, and provided with thills for a horse or for transporting the filter by hand. The dimensions of the cylinder are commonly two feet in diameter and three feet in height.

The new filtering material consists of charcoal, (six to twelve parts,) with one part of washed river-sand and one part of magnesite or Portland cement diluted in water, (about one part,) according to the degree of dryness of the charcoal. This filtering matter constitutes the "briquet layers," which are washed after the fabrication with hot water for removing the excess of free lime when Portland cement is used. The briquet layers are made as separate round cakes 7, having a diameter corresponding to the dimensions of the cylinder by compression or ramming to the desired degree of density in suitable molds or by compressing or ramming the matter directly in the filter-cylinder. Several such briquet layers, one to two inches thick, are superposed—say twelve to twenty-four of them. In practice one or two of the lower filter cakes or layers are removed every month. The filter-cakes are held in place in the cylinder by removable wire nets 8. Between each two briquet layers a bed or layer of washed sand 9 (about one-fourth inch thick) is interposed. The upper briquet layer corresponding to the issue of filtered water may be at least seven inches thick. After all the briquet layers have been removed at the end of the year new briquet layers may be placed in the cylinder. The joints between the wall of the cylinder and the briquet layers are filled with a mortar constituted by one part of cement and three parts of sand. This filtering matter absorbs only the particles which can penetrate in the pores of the material, while the coarser particles are deposited at the bottom of the vessel, the filter being placed vertically, and may be withdrawn through the purging-cock $c$.

All the briquet layers have the same degree of porosity and the larger part of impurities will be arrested by the lower cake.

When the filter is to be charged with new briquet layers or when the first layer is to be removed, the vessel must be turned upside down.

The rotative filter may work at different pressures, according to the density of the briquet layers. It can be installed directly on a water-conduit or acted by a pump. Water is always supplied at the bottom and taken from the top of the cylindrical vessel.

The advantages of this filter consist in this feature that the production of filtered water is always proportional to the quantity of the filtering matter. Thus an indefinite bulk of filtered water can be obtained, according to the dimensions and to the number of working filters.

The rotative filters will serve all necessities of the population, giving filtered water for drinking, for use in kitchens, and in general for the domestic needs. The filtering matter is very cheap and after having served may be used as manure or, being dried, as fuel. In this latter case the dried matter is mixed at equal parts with any other suitable fuel.

The rotative position and the mobility of the filters make them very commodious at every point.

I claim—

A filter cake or material consisting of charcoal, sand and magnesite or Portland cement.

In witness whereof I have hereunto set my hand in presence of two witnesses.

NICHOLAS JACOBSOHN.

Witnesses:
N. TSCHEKALOFF,
J. BLAU.